United States Patent
Miller, Jr.

(10) Patent No.: US 9,212,626 B2
(45) Date of Patent: Dec. 15, 2015

(54) ENGINE PROPULSION SYSTEM

(71) Applicant: Derrick T. Miller, Jr., Houston, TX (US)

(72) Inventor: Derrick T. Miller, Jr., Houston, TX (US)

(*) Notice: Subject to any disclaimer, the term of this patent is extended or adjusted under 35 U.S.C. 154(b) by 0 days.

(21) Appl. No.: 14/300,043

(22) Filed: Jun. 9, 2014

(65) Prior Publication Data
US 2015/0013302 A1 Jan. 15, 2015

Related U.S. Application Data

(60) Provisional application No. 61/844,753, filed on Jul. 10, 2013.

(51) Int. Cl.
| | | |
|---|---|---|
| *F02K 9/00* | (2006.01) | |
| *F41A 19/13* | (2006.01) | |
| *H02K 7/18* | (2006.01) | |
| *F02C 3/16* | (2006.01) | |
| *F02C 5/04* | (2006.01) | |

(52) U.S. Cl.
CPC . *F02K 9/00* (2013.01); *F02C 3/165* (2013.01); *F02C 5/04* (2013.01); *F41A 19/13* (2013.01); *H02K 7/1823* (2013.01)

(58) Field of Classification Search
CPC ............... F02C 5/12; F02C 6/16; F02C 7/18; F02C 7/36; F02C 3/165; F02C 5/04; F01D 9/023; F02K 7/06; F02K 9/00; F41A 7/10; F41A 19/15; H02K 7/1823; H02K 7/1853
USPC .......... 60/726, 727, 805, 39.78, 39.39; 92/31, 92/32
See application file for complete search history.

(56) References Cited

U.S. PATENT DOCUMENTS

| | | | |
|---|---|---|---|
| 2,382,526 A * | 8/1945 | White | 173/159 |
| 2,710,067 A | 6/1955 | Sforza Del Pescaro | |
| 2,981,064 A | 4/1961 | Beaven | |
| 3,951,217 A * | 4/1976 | Wallace et al. | 173/169 |
| 4,185,714 A | 1/1980 | Pascouet et al. | |
| 5,694,764 A * | 12/1997 | Blain et al. | 60/787 |
| 6,634,438 B1 * | 10/2003 | Pusateri et al. | 173/1 |
| 7,328,570 B2 * | 2/2008 | Venkataramani et al. | 60/39.38 |
| 7,526,912 B2 * | 5/2009 | Tangirala et al. | 60/247 |
| 7,669,405 B2 * | 3/2010 | Pinard et al. | 60/247 |
| 8,020,631 B2 * | 9/2011 | Kobayashi | 173/218 |
| 8,277,208 B2 * | 10/2012 | Paluszewski et al. | 418/15 |
| 8,281,594 B2 * | 10/2012 | Wiebe | 60/733 |
| 2003/0010514 A1 * | 1/2003 | Taga | 173/213 |
| 2009/0139199 A1 * | 6/2009 | Kenyon et al. | 60/39.39 |
| 2010/0178186 A1 * | 7/2010 | Peters et al. | 418/15 |
| 2011/0107762 A1 | 5/2011 | Yamamoto et al. | |

* cited by examiner

*Primary Examiner* — Andrew Nguyen
*Assistant Examiner* — Jason H Duger
(74) *Attorney, Agent, or Firm* — Plager Schack LLP

(57) ABSTRACT

An engine propulsion system is configured to utilize bursts of pressurized media in order to transmit mechanical energy. The engine propulsion system includes at least one cannon, wherein each cannon is configured to displace the pressurized media and further includes a casing configured to accommodate a rotational firing pin. The rotational firing pin is configured to transmit the mechanical energy.

11 Claims, 14 Drawing Sheets

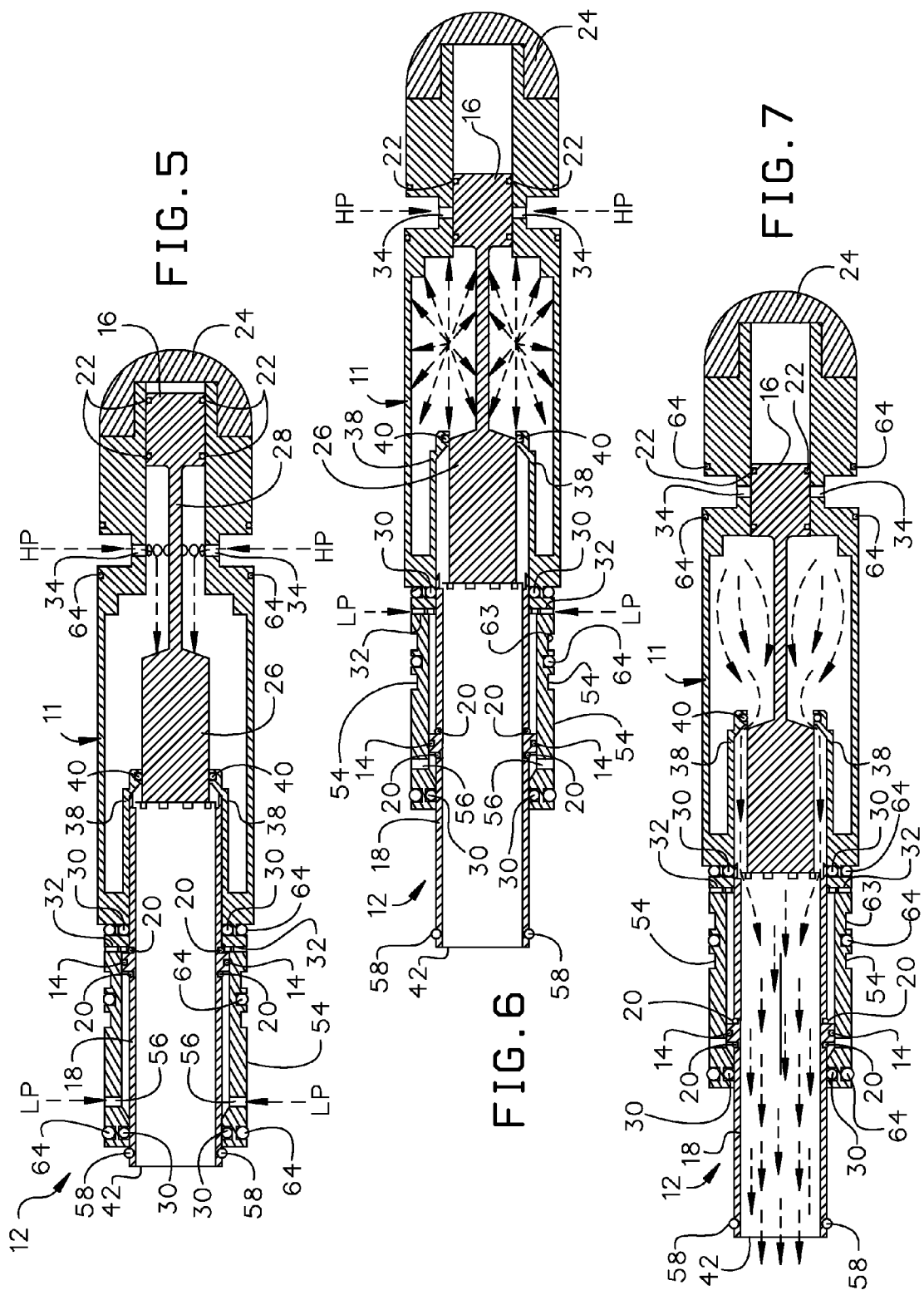

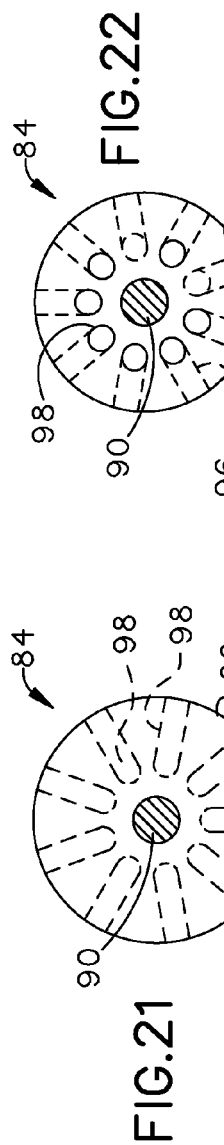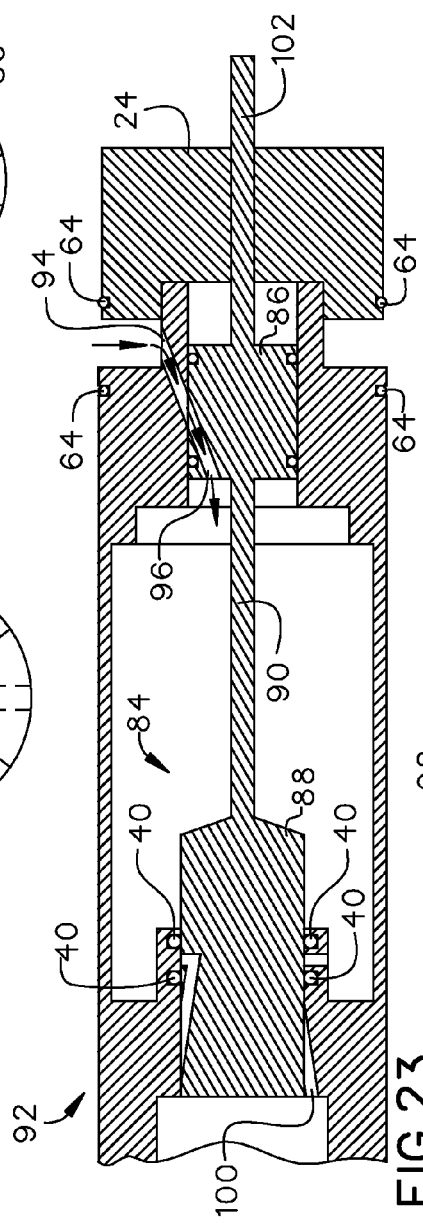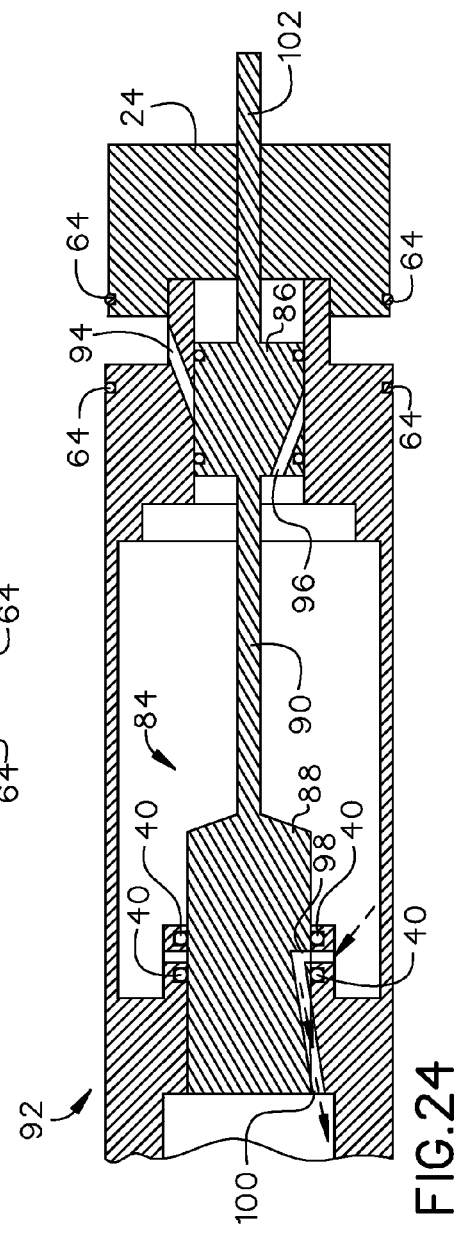

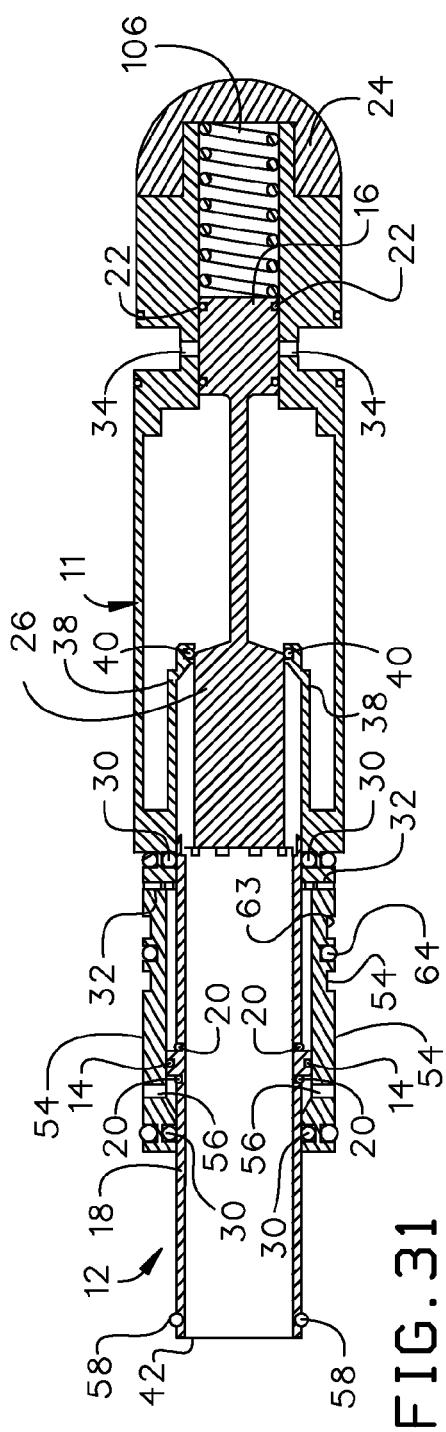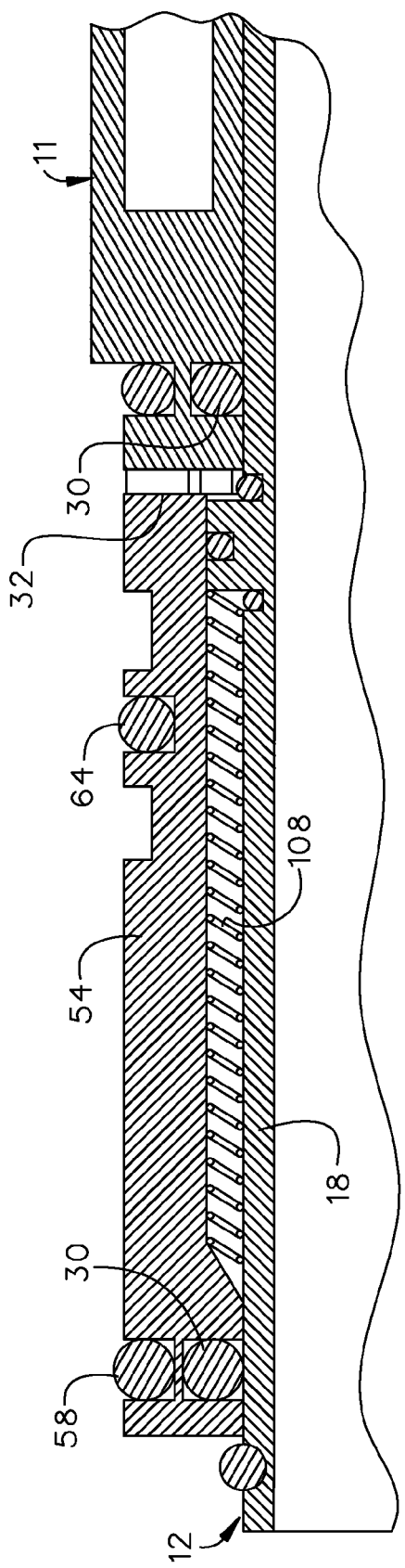

ENGINE PROPULSION SYSTEM

RELATED APPLICATION

This application claims priority to provisional patent application U.S. Ser. No. 61/844,753 filed on Jul. 10, 2013 the entire contents of which is herein incorporated by reference.

BACKGROUND

The embodiments herein relate generally to mechanical actuators that convert hydraulic pressure and flow into torque and angular displacement.

Prior to embodiments of the disclosed invention, engines utilized a large number of moving parts that reduced system efficiency instead of concentrating on turning a shaft. Embodiments of the present invention propose more efficient mechanical actuators by using fewer hinges and connections, thus more energy turns the shaft. Other embodiments of the disclosed invention provide for precision air injection for combustion engines and bursts of air for removing debris or water from windshields.

SUMMARY

An engine propulsion system is configured to utilize bursts of media in order to transmit mechanical energy. The engine propulsion system includes at least one cannon, wherein each cannon is configured to displace the media and further includes a firing pin casing configured to accommodate a firing pin. The firing pin is configured to transmit the mechanical energy when moved thus allowing the media to exit the cannon.

In some embodiments, the firing pin can comprise a channel and be mechanically coupled to a second pressure regulator and a first pressure regulator. The second pressure regulator can be configured to permit second pressure media to enter the firing pin. The first pressure regulator can be configured to pass through a solenoid to permit first pressure media, to enter a first pressure cannon port to charge and a first pressure port to fire. A firing pin obstruction cylinder can be located in the channel and arranged to obstruct movement of the second pressure media in the channel. A hat can be mechanically coupled to the firing pin and immediately adjacent to the firing pin obstruction cylinder which permits the second pressure media to move past the firing pin obstruction cylinder through the channel once the first pressure media has pushed the firing pin obstruction cylinder past the hat. The second pressure media can be configured to transmit the mechanical energy configured to be used in the engine propulsion system.

In some embodiments, the at least one cannon can be proximate a media propulsion system. The media propulsion system can further comprise a reservoir which contains the media. The media propulsion system can further comprise a pump configured to pump the media. The media propulsion system can further comprise at least one pressure intensifier to condition the media for pressurization. The media propulsion system can further comprise at least one check valve. The media propulsion system can further comprise at least one accumulator attached to a regulator and is configured to accumulate the media. The media propulsion system can further comprise at least one solenoid attached to the firing pin casing and configured to disperse the media. The media propulsion system can further comprise a tube seal proximate a tube media exit wherein a second pressure media is discharged through the tube media exit causing propulsion. The media propulsion system can further comprise seals configured to isolate the media from all channels and configured to prevent the media from inadvertently escaping a controlled exit from the engine propulsion system.

In some embodiments, the at least one cannon can have one exit port. In other embodiments, the at least one cannon can be a plurality of cannons and the plurality of cannons can share an exit port. The at least one cannon can be configured to operate in a synchronized mode of operation. The synchronized mode of operation can use at least one motor. The at least one cannon can be configured to operate in an alternating mode of operation. The alternating mode of operation can use at least one motor.

In some embodiments, the engine propulsion system can further include an axel mechanically coupled to the at least one cannon. The at least one cannon can transmit the mechanical energy by turning the axel. A surface can be sealed and covered in order to prevent injury which otherwise could be caused by exposure to the surface.

An engine propulsion system further comprises turbine blades that can be mechanically coupled to at least one cannon. A turbine shaft can be mechanically coupled to the turbine blades configured such that the at least one cannon transmit mechanical energy by turning the turbine shaft. In some embodiments, an electronic propulsion nozzle arranged proximate turbine blades and configured to allow space flight.

An energy generation tubing or channel can be configured to charge a battery. The energy generation tubing comprises a plurality of turbine shafts each mechanically coupled to a plurality of turbine blades. At least one generator can be attached to each turbine shaft forming a series of turbine/generator systems. A medium surrounding and passing the series of turbine/generator systems can generate electrical power.

An energy generation tubing or channel can be configured to charge a battery. The energy generation tubing comprises a plurality of turbine shafts each mechanically coupled to a plurality of turbine blades. At least one generator can be attached to each turbine shaft forming a series of turbine/alternator systems. A medium surrounding and passing the series of turbine/generator systems can generate electrical power.

A cannon can be configured to displace media. The cannon can include a firing pin that is a rotational firing pin having a stern and an obstruction cylinder which can be mechanically coupled to the stern with a stem. At least one charge shaft can be embedded within the stern and configured to be located immediately adjacent to a pressure input port. At least one firing shaft can be embedded within the obstruction cylinder. A turn shaft can be mechanically coupled to the stern. A second pressure media can be configured to charge at least one pressure input port and release from at least one firing port allowing transmission of mechanical energy.

In some embodiments, the cannon can further comprise a hat mechanically coupled to the firing pin and immediately adjacent to the firing pin obstruction cylinder which permits pressurized media to move past the firing pin obstruction cylinder through the channel once the pressurized media has pushed the firing pin obstruction cylinder past the hat. The pressurized media can be configured to transmit the mechanical energy.

A cannon can be configured to displace media. The cannon can comprise a firing pin casing configured to accommodate a firing pin. The firing pin can comprise a channel and be mechanically coupled to a second pressure regulator and a first pressure regulator. The second pressure regulator can be configured to permit second pressure media to enter the firing pin. The first pressure regulator can be configured to permit first pressure media to travel through a solenoid configured to direct firing or charging of the cannon. The second pressure regulator and the first pressure regulator can be further mechanically coupled to a media propulsion system. A firing pin obstruction cylinder can be located in the channel and arranged to obstruct movement of the second pressure media in the channel. The second pressure media can be configured to transmit mechanical energy.

In some embodiments, the at least one cannon can be configured to operate in a synchronized mode of operation. The synchronized mode of operation can use at least one motor. The at least one cannon can have at least one exit port. The at least one cannon can be a plurality of cannons and the plurality of cannons share an exit port.

In some embodiments, the at least one cannon can be configured to operate in an alternating mode of operation. The alternating mode of operation can use at least one motor. The at least one cannon can have at least one exit port. The at least one cannon can be a plurality of cannons and the plurality of cannons share an exit port.

An electronic system can be configured to operate an engine propulsion system to transmit mechanical energy. The electronic system can include a central processing unit mechanically coupled to the engine propulsion system and configured to engage the engine propulsion system.

In some embodiments, the central processing unit can further communicate with a local processing unit communicatively coupled to solenoids which directs the engine propulsion system. The central processing unit can further comprise processor instructions for accelerating the engine propulsion system, further comprising: calculating stored energy available. The central processing unit can further comprises processor instructions for accelerating the engine propulsion system, further comprising: determining additional energy and/or firing rate needed to accelerate. The central processing unit can further comprise processor instructions for accelerating the engine propulsion system, further comprising: increasing pressure and/or firing rate of a media thereby obtaining additional energy. The central processing unit can further comprises processor instructions for accelerating the engine propulsion system, further comprising increasing a cannon firing rate. The central processing unit further can further comprise processor instructions for accelerating the engine propulsion system, further comprising: calculating and displaying a time until stored energy and/or media is depleted. The central processing unit can further comprise processor instructions for decelerating the engine propulsion system, further comprising: reducing a cannon firing rate. The central processing unit can further comprise processor instructions for decelerating the engine propulsion system, further comprising: decreasing energy being emitted on the engine propulsion system. The central processing unit can further comprise processor instructions for decelerating the engine propulsion system, further comprising: calculating and displaying a time until stored energy is restored. The central processing unit can further comprise processor instructions for decelerating the engine propulsion system, further comprising: displaying an error if an operating rate is less than or equal to a rate to increase stored energy; but only if a first stored energy value at a first time is equal to a second stored energy value at a second time. A local processing unit can be communicatively coupled to each solenoid wherein at least one solenoid is mechanically coupled to at least one cannon. The local processing unit can directs the at least one solenoid as to when to fire each connected cannon.

A process for transmitting mechanical energy on a rotating device contains the following steps which are not necessarily in order: First, attaching a propulsion device to the rotating device. Next, surrounding the propulsion device with a media. Then, pushing the media from the propulsion device creating a force. The force moves the rotating device creating the mechanical energy.

In some embodiments, following that, directing flow of the media through a cannon with at least one solenoid. In some embodiments, after that, isolating media from all channels with seals and preventing the media from inadvertently escaping a controlled exit from the rotating device.

BRIEF DESCRIPTION OF THE FIGURES

The detailed description of some embodiments of the invention is made below with reference to the accompanying figures, wherein like numerals represent corresponding parts of the figures.

FIG. 5 is a section detail view of the invention demonstrating charge state.

FIG. 6 is a section detail view of the invention demonstrating mid state.

FIG. 7 is a section detail view of the invention demonstrating firing state.

FIG. 21 is a section view of an embodiment of the invention along line 21-21 in FIG. 18.

FIG. 22 is a section view of an embodiment of the invention along line 22-22 in FIG. 18.

FIG. 23 is a longitudinal cross section view of an embodiment of the invention demonstrated in initial charge state.

FIG. 24 is a longitudinal cross section view of an embodiment of the demonstrated with the rotational firing pin in 20 degree rotation offset from FIG. 23 in firing state.

FIG. 31 is a section view of an embodiment of the invention.

FIG. 32 is a section view of an embodiment of the invention.

DETAILED DESCRIPTION OF CERTAIN EMBODIMENTS

Figure 1A:
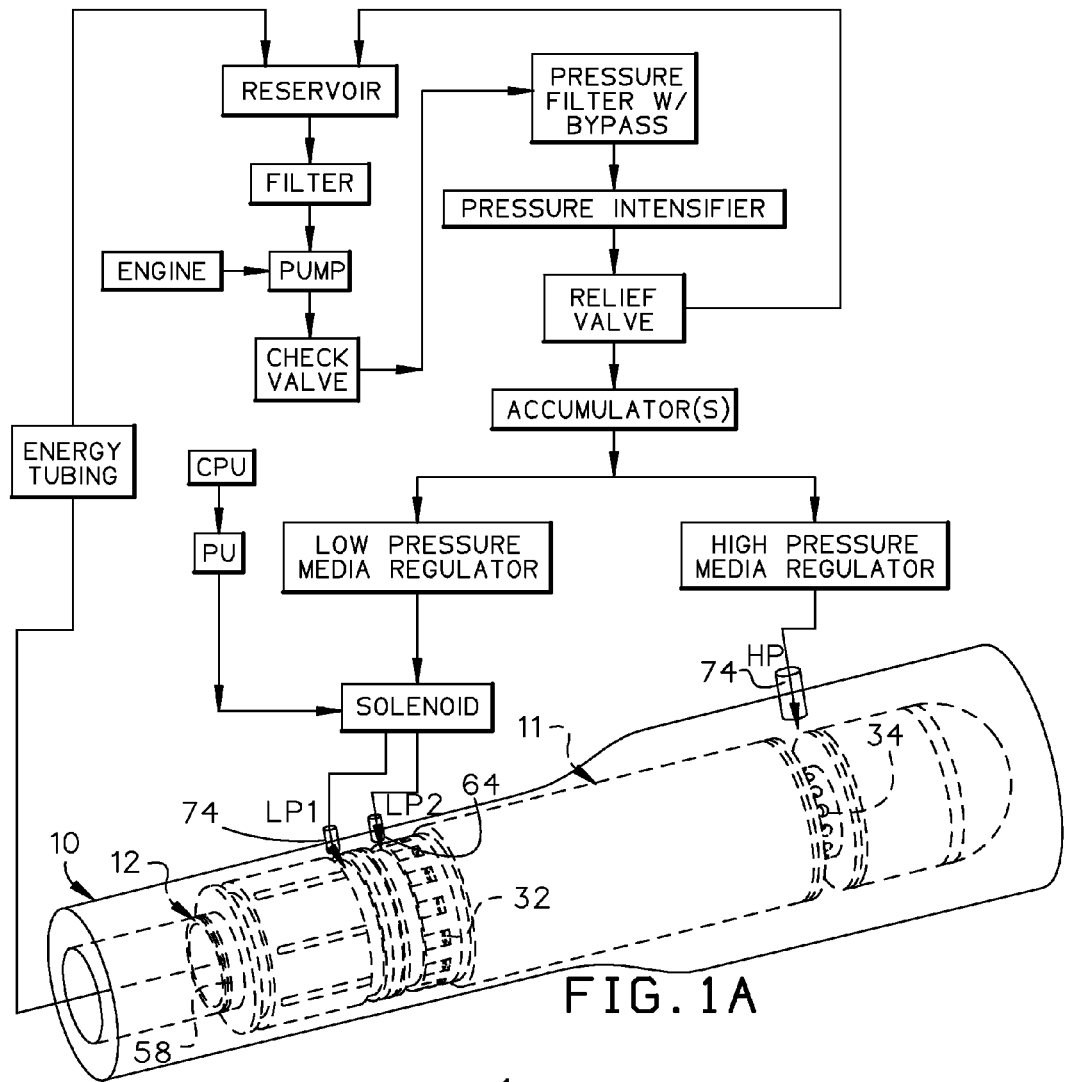
FIG. 1A is a schematic/perspective view of the invention.
Figure 1B:
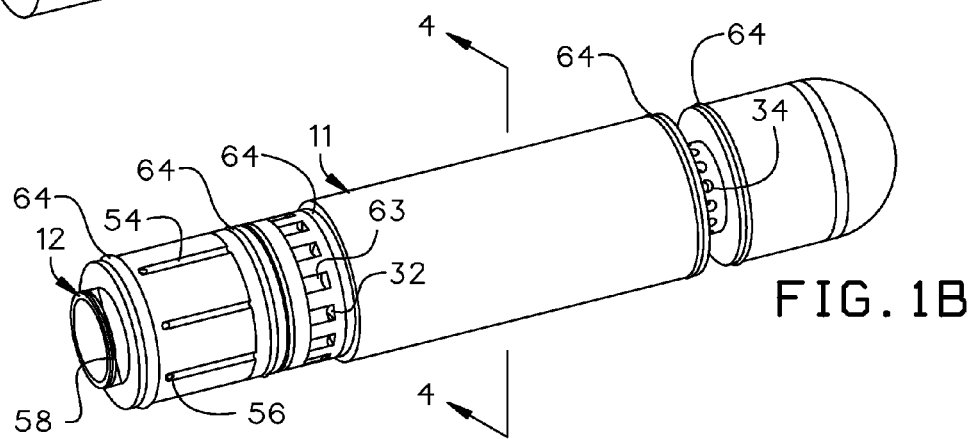
FIG. 1B is a perspective view of the invention omitting the cannon.
Figure 2:
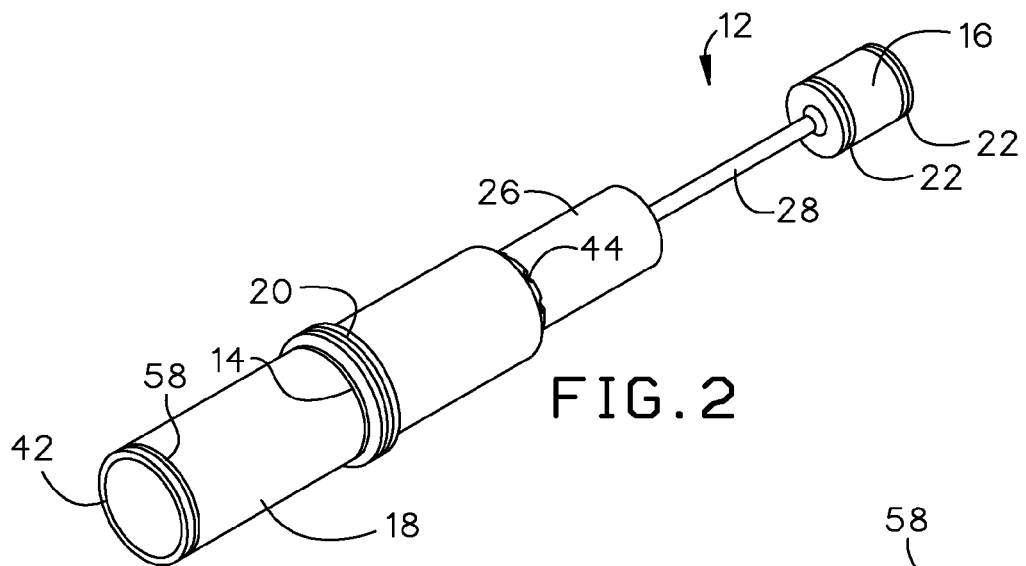
FIG. 2 is a forward perspective view of the invention showing the firing pin only.
Figure 3:
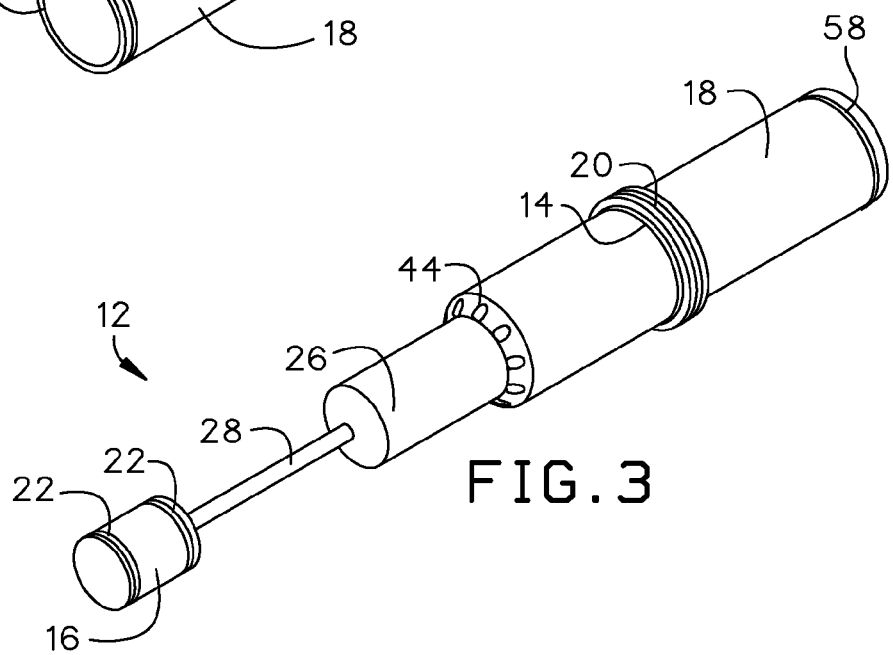
FIG. 3 is a rear perspective view of the firing pin only.
Figure 4:
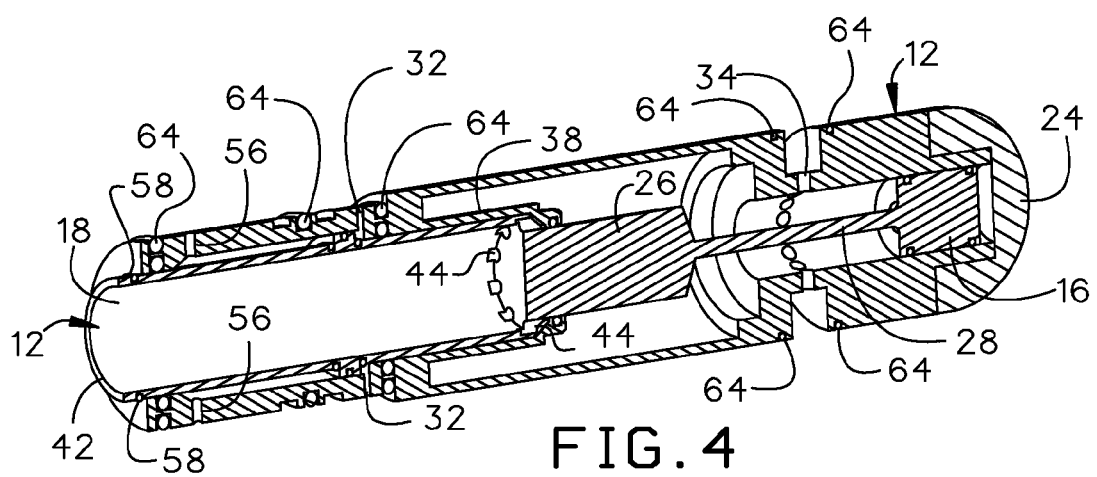
FIG. 4 is a section perspective view of the invention along line 4-4 in FIG. 1.

By way of example, and referring to FIG. 1A, one embodiment of the engine propulsion system comprises cannon 10 which is a housing for firing pin 12. Firing pin 12 comprises firing pin outer casing 11 which is mechanically coupled to cannon 10 such that second pressure media input 74 can insert second pressure media into second pressure cannon port entrance 34. Likewise, firing pin outer casing 11 is mechanically coupled to cannon 10 such that first pressure media input 63 can insert first pressure media into first pressure cannon port entrance 32 and first pressure port to charge channel 54 can insert first pressure media into first pressure port to charge 56. First pressure media and second pressure media are simply terms used to show that these two pressures are different. Either could be greater than the other and the system would still function.

Firing pin 12 receives and then ejects second pressure media in order to transmit mechanical energy. The media is first collected in the reservoir from the energy tubing that houses a plurality of turbines, which when turned from the flow of media, which charges the system's battery. The media is pumped through a filter with a pump powered by a separate engine and is then conditioned for pressurization and safety by pushing the media through filters, a check valve, a pressure intensifier and safety relief valve, which the whole system can also include at least one double block and bleed valve or a plurality of double block and bleed valves. In some embodiments, there is at least one check valve, but in other embodiments there can be a plurality of check valves. In some embodiments, there is at least one pressure intensifier, but in other embodiments there can be a plurality of pressure intensifiers. In some embodiments, there is at least one safety relief valve, but in other embodiments there can be a plurality of safety relief valves.

The media is then stored for compression in the system's accumulators. In some embodiments there is at least one accumulator, but in other embodiments there may be a plurality of accumulators. The accumulators which may be of different types such as bladder, piston, gas, etc. Once in the accumulators the second pressure regulator and the first pressure regulator are pressurized and the central processing unit (CPU) and a local processing unit (PU) command the system and individual cannon 10 system solenoids to fire the media from the firing pin 12 through the cannon exit causing propulsion. Both the CPU and PU function by executing processor instructions. In some embodiments, this can occur in a closed media propulsion system, which is defined as a system with a fixed amount of media either actively engaged in the system or in the reservoir. In some embodiments, this can occur in an open media propulsion system, which is defined as a system where media can enter and leave the system. In some embodiments there can be at least one solenoid. In other embodiments, there can be a plurality of solenoids. Where there are a plurality of cannons 10 and a plurality of solenoids each solenoid must have a connected cannon such that the solenoid can direct the connected cannon as to when to fire.

FIGS. 1B, 2, 3 and 4 show firing pin 12 in more detail. Firing pin 12 comprises firing pin stern 16 mechanically coupled to two firing pin stern seals 22. Firing pin stern 16 is mechanically coupled to firing pin stem 28. Firing pin stem 28 is further mechanically coupled to firing pin obstruction cylinder 26. Firing pin obstruction cylinder 26 is connected to hat 38. Hat 38 is perforated by firing pin cylinder ports for second pressure media 44. Hat 38 is mechanically coupled to firing pin sail bumper 20 with firing pin sail seal 14. Firing pin sail bumper 20 is attached to firing pin tube 18 which is hollow and comprises a channel. Firing pin tube 18 is mechanically coupled to tube seal 58 proximate tube media exit 42. The seals operate to ensure that the media makes a controlled exit from the cannon at an exit port. A controlled exit is one that is parallel to the direction of intended force, and uncontrolled exit, or explosion, occurs when media is dispersed randomly in a direction other than that parallel to desired force.

Firing pin stern 16 takes the shape of a modified cube, or cylinder, which can move slightly within firing pin outer casing 11 toward and away from end cap 24 which is mechanically coupled to firing pin outer casing 12. Firing in outer casing 12 is perforated with second pressure cannon port entrance 34 which permits second pressure media to enter firing pin 12 as indicated above. However, each side of firing pin outer casing 11 proximate second pressure cannon port entrance 34 is mechanically coupled to outer seal 64 to keep the second pressure media from otherwise entering firing pin 12.

To contrast, the lower pressure inlet is designed in a slightly different manner to minimize moving parts and ensure efficiency. Firing pin outer casing 11 is perforated with first pressure port to fire 32 which can allow first pressure media to enter the channel. First pressure port to fire 32 is surrounded by main shaft seal 30 and outer seal 64 to ensure that first pressure media is directed into the channel and not elsewhere.

A second pressure inlet is designed to charge the system as shown in more detail in FIG. 5. Firing pin outer casing 11 is perforated with first pressure port to charge channel 56 which can allow first pressure media to enter the channel. First pressure port to charge channel 56 is surrounded by main shaft seal 30 and outer seal 64 to ensure that first pressure media is directed into the channel and not elsewhere.

FIG. 5, FIG. 6 and FIG. 7 show the firing pin firing sequence. When firing pin stern 16 is distant end cap 24, the CPU sends a signal to allow the solenoid to activate the first pressure media through first pressure port to charge channel 56 enabling media transfer to push firing pin stern 16 proximate end cap 24. Once firing pin stern 16 is proximate end cap 24, the firing pin is charged. Firing pin 12 cannot be prematurely discharged because hat 38 is surrounded by hat seal 40 which prevents movement of media.

Once the firing pin is charged the CPU sends a signal to allow the solenoid to activate the transfer of first pressure media through first pressure cannon port entrance 32. This pushes firing pin obstruction cylinder away from end cap 24. This allows a greater amount of pressurized media to pressurize the firing pin causing the firing pin to fire. Finally, the second pressure media pushes firing pin obstruction cylinder 26 past hat 38 allowing second pressure media to discharge through tube media exit 42.

Figure 8:
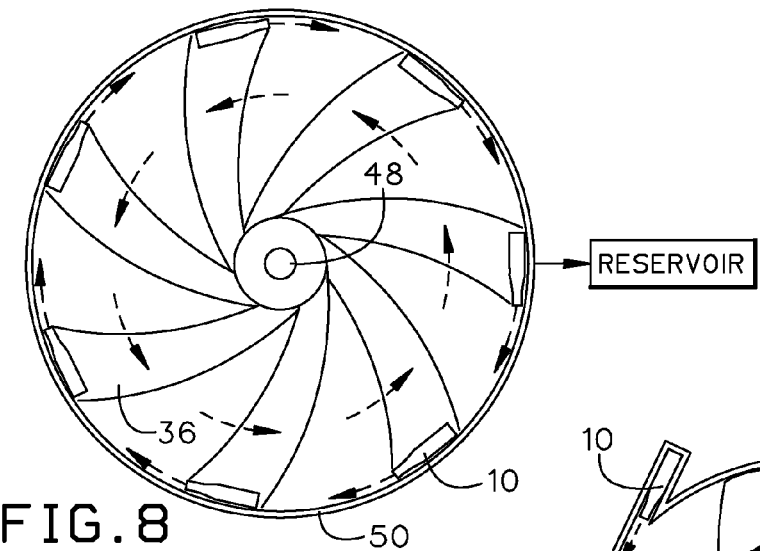
FIG. 8 is a schematic view of the invention demonstrating an application with a turbine.
Figure 9:
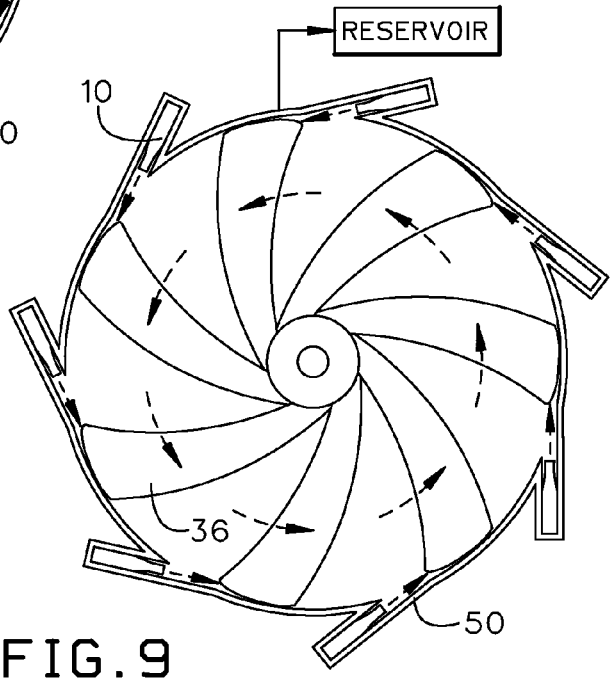
FIG. 9 is a schematic view of the invention demonstrating an application with the turbine.
Figure 10:
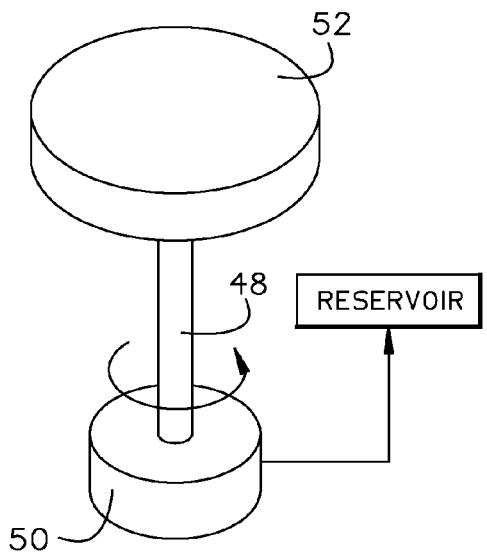
FIG. 10 is a schematic view of the invention demonstrated in use with turbine and generator/alternator.

FIG. 8, FIG. 9 and FIG. 10 offer one embodiment of how to user cannon 10. Cannon 10 is mechanically coupled to turbine blades 36 which turn turbine shaft 48 inside of a sealed turbine enclosure 50. Turbine shaft 48 could be used to turn turbine/generator systems 52 or a series of turbine/alternator systems as shown in FIG. 10 or for any other purpose. Turbine shaft 48 is an example of an axle that is used in a turbine, but other kinds of axles can be used as well.

An electronic propulsion system or electronic system is mechanically coupled to the energy propulsion system configured to determine when each cannon 10 is configured to fire and then reload. A surface such as turbine blades 36 is mechanically coupled to each cannon wherein each cannon firing moves the surface. The surface is sealed and covered in order to prevent injury which otherwise could be caused by exposure to the surface. The surface is utilized to transmit mechanical energy.

This can also be viewed as a process for transmitting mechanical energy on a rotating device. The process has the following steps which are not necessarily in order: first, directing a propulsion device towards the rotating device. The propulsion device can be cannon 10 and the rotating device can be the turbine with turbine blades 36 attached to turbine shaft 48. Next, pushing a media from the propulsion device creating a force. The force moves the rotating device transmitting the mechanical energy.

In some embodiments the turbine can be attached to a generator/alternator. In some embodiments there is at least one alternator, but in other embodiments there may be a plurality of alternators. In some embodiments there is at least one generator, but in other embodiments there may be a plurality of generators. In some embodiments, there is at least one motor, but in other embodiments there may be a plurality of motors.

In some embodiments the turbine can be attached to cannon 10. In some embodiments there is at least one cannon 10, but in other embodiments there may be a plurality of cannons 10. In some embodiments, the plurality of cannons can share at least one exit port.

Figure 11:
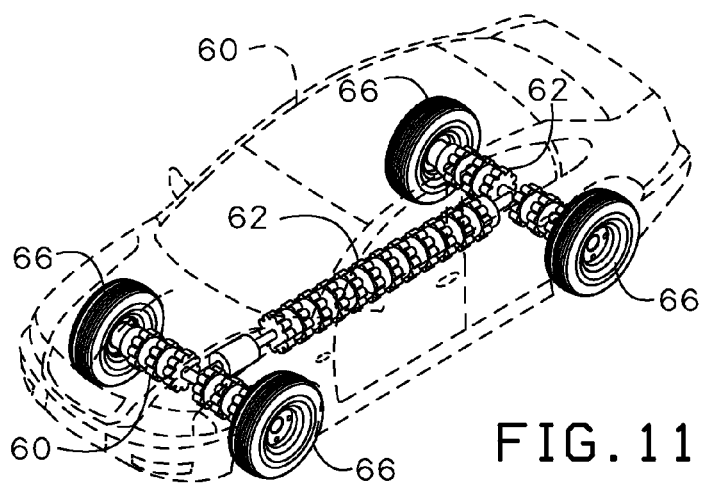
FIG. 11 is a schematic view of an embodiment of the invention demonstrating usage of system with vehicle.

FIG. 11 shows another use in automobile 60. Here many turbines can be used to turn shaft 62 and thus wheels 66 either individually or in concert as determined by the CPU.

Figure 12:
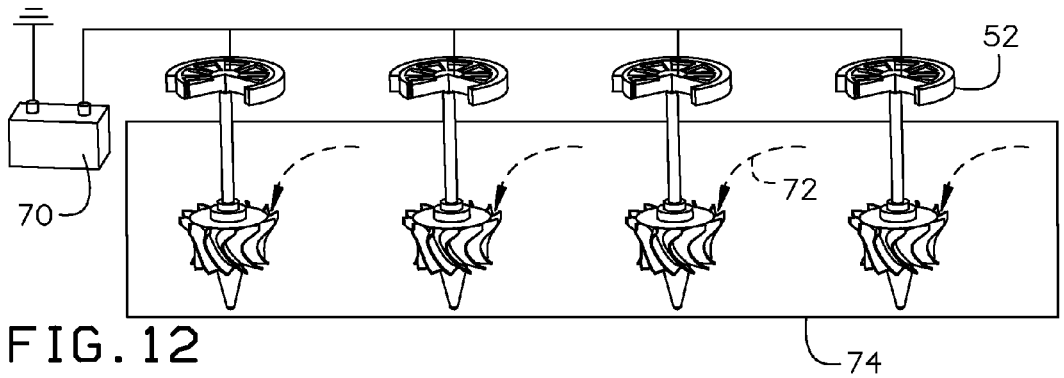
FIG. 12 is a schematic view of the invention showing energy generation tubing.

FIG. 12 shows another embodiment containing an energy generation tubing designed to charge battery 70. Second pressure media input 74 surrounds medium 72 which turns a series of turbine/generator systems 52 which in turn charge battery 70 with electrical power. As used in this application, a generator means a device that generates power, whether it be by alternating current or direct current.

Figure 13:
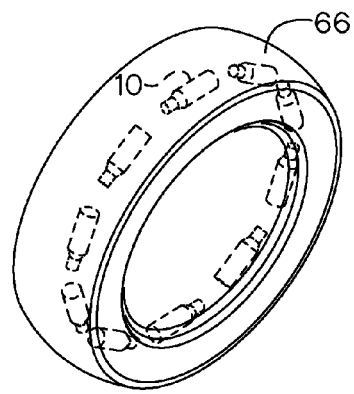
FIG. 13 is a perspective view of an embodiment of the invention.
Figure 14:
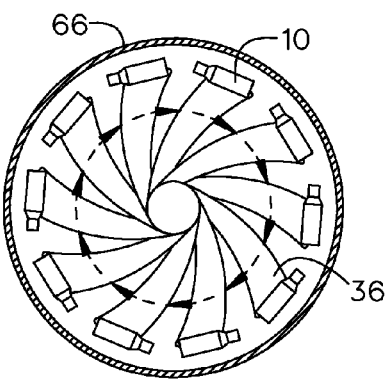
FIG. 14 is a section view of an embodiment of the invention.

FIG. 13 and FIG. 14 show an alternate embodiment involving wheel 66. Each wheel contains a media that covers turbine blades 36 mechanically such that each wheel can spin on its own without powering a shaft as in FIG. 11. Likewise, the CPU can act as a controller.

Figure 15:
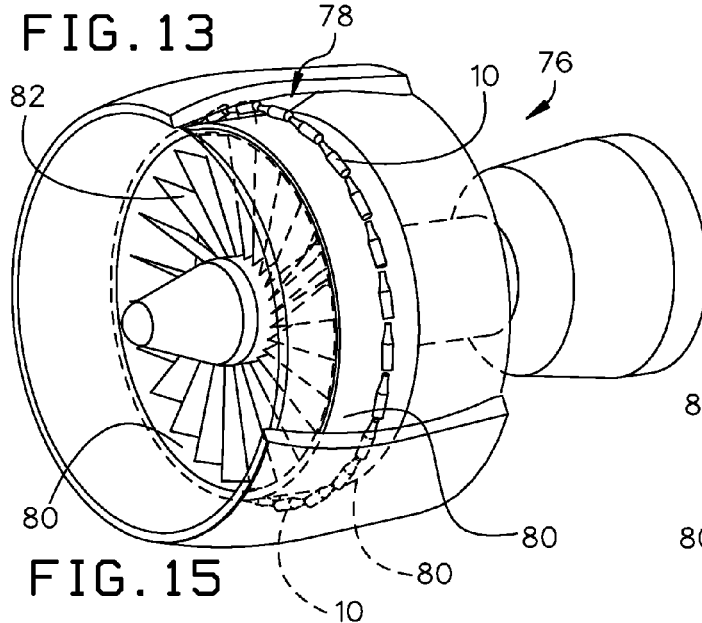
FIG. 15 is a perspective view of an embodiment of the invention.
Figure 16:
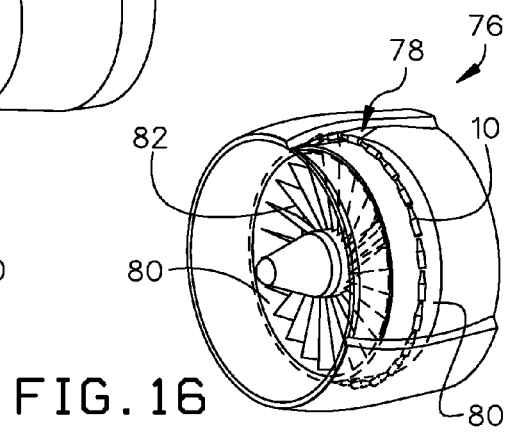
FIG. 16 is a perspective view of an embodiment of the invention.
Figure 17:
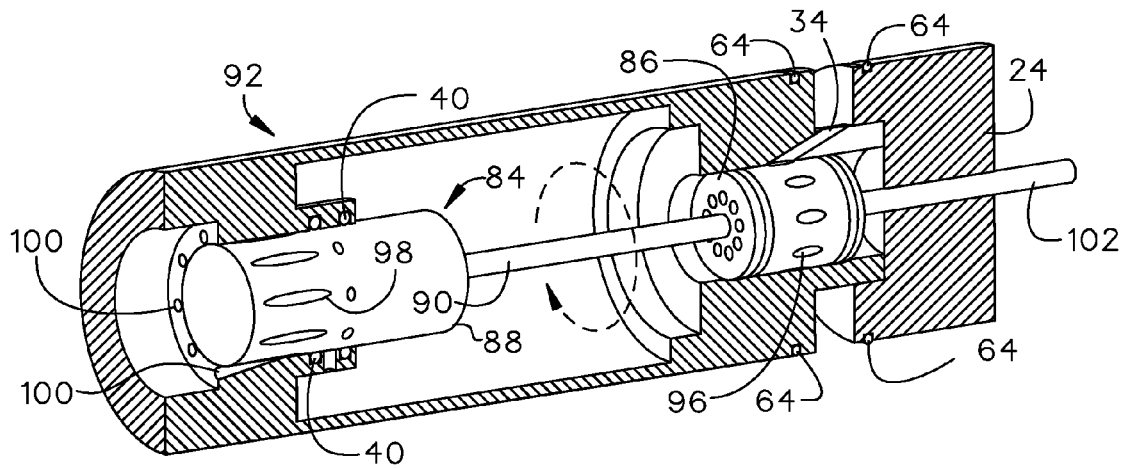
FIG. 17 is a section perspective view of an alternate embodiment of the invention.
Figure 18:
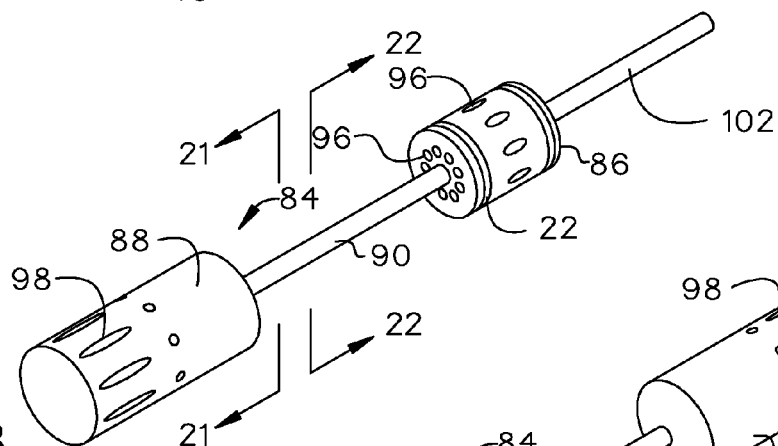
FIG. 18: is a front perspective view of an embodiment of the rotational firing pin only.
Figure 19:
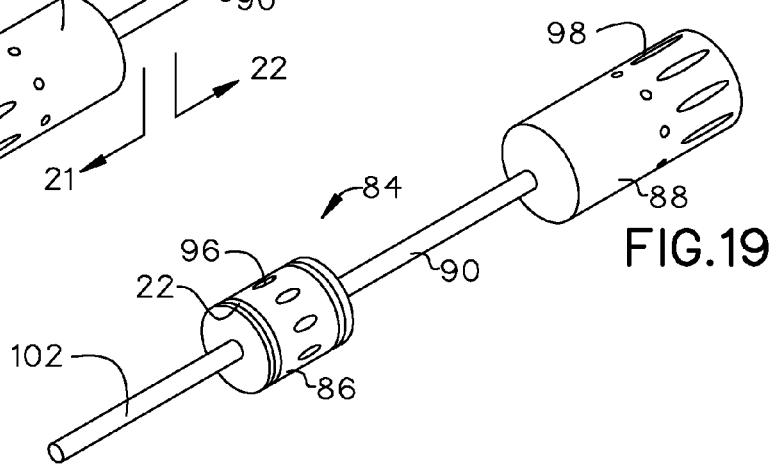
FIG. 19 is a rear perspective view of an embodiment of the rotational firing pin.
Figure 20:
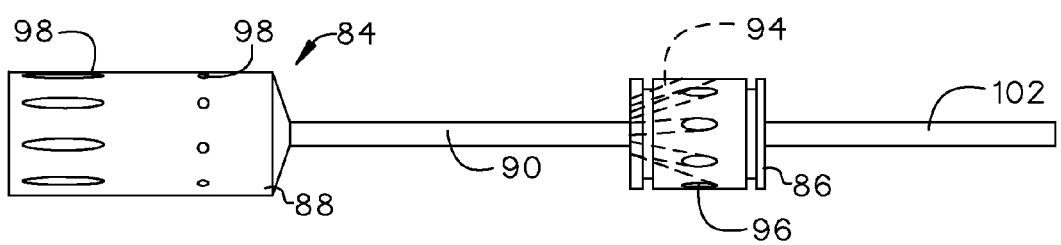
FIG. 20 is a side view of an embodiment of the rotational firing pin.

FIG. 15 and FIG. 16 show another embodiment of the present invention using jet engine 76. Jet engine 76 comprises medium cavity 78 mechanically coupled to cavity divider 80. One side of cavity divider 80 is mechanically coupled to turbine blades 82. The other side of cavity divider 80 is mechanically coupled to a plurality of cannons 10. Cannons 10 turn cavity divider 80 and thus turbine blades 82 creating propulsion. In some embodiments, a de Laval Nozzle can be utilized with a gas source to enable spaceflight. In other embodiments, any electronic propulsion nozzle can be used.

FIG. 17, FIG. 18, FIG. 19, FIG. 20, FIG. 21 and FIG. 22 show various views of rotational firing pin 84. Rotational firing pin 84 comprises stern 86 connected to obstruction cylinder 88 with stem 90. Stern 86 is further mechanically coupled to turn shaft 102. Stern 86 further comprises at least one firing shaft 98 each connected to at least one charge shaft 96 and stern 86 is sealed with stern seal 22. Obstruction cylinder 88 further comprises a plurality of the firing shafts 98.

Turning to FIG. 23 and FIG. 24, rotational firing pin 84 is housed in outer casing 92. Outer casing 92 comprises second pressure cannon port entrance 34. Second pressure cannon port entrance 34 is configured to permit media through second pressure input port 94. Each side of outer casing 92 proximate second pressure input port is mechanically coupled to outer seal 64 to keep the second pressure media from otherwise entering rotational firing pin 84. Likewise each side of obstruction cylinder 88 proximate the plurality of firing shafts 98 is mechanically coupled to hat seal 40 to prevent unwanted discharge of the second pressure media through a location other than the plurality of firing shafts 98. The second pressure media is discharged through outer casing firing port 100.

FIGS. 23 and 24 further demonstrate the rapid firing sequence of rotational firing pin 84. Second pressure media is inserted through second pressure input port 94, and down rotational firing pin charge shaft 96 pressurizing a chamber surrounding some of obstruction cylinder 88 and stem 90. The second pressure media is discharged through at least one firing shaft 98 allowing rotation of obstruction cylinder 88, stem 90, stern 86 and turn shaft 102 thus transmitting mechanical energy that can be used for a variety of purposes.

In some embodiments there can be at least one rotational firing pin 84. In other embodiments there can be a plurality of rotational firing pins 84.

Figure 25:
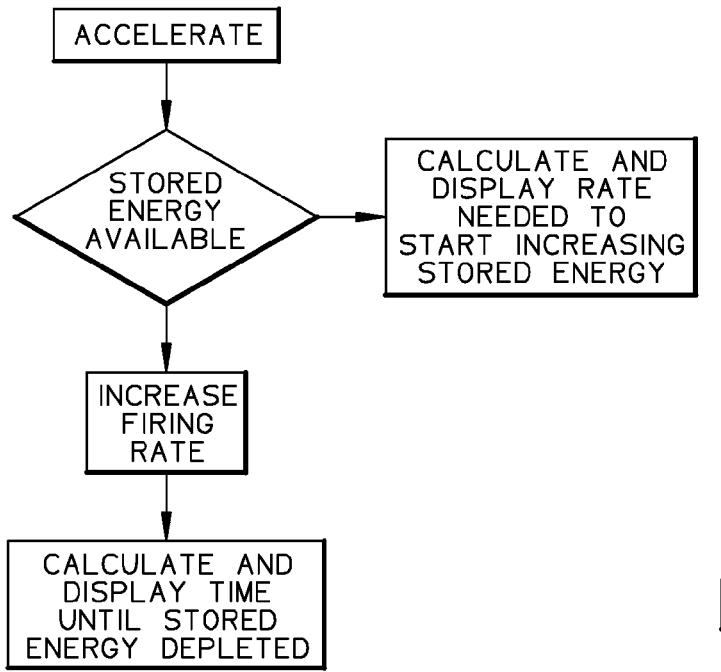
FIG. 25 is a schematic view of an embodiment of the invention.

FIG. 25 shows a logic pattern for operating an embodiment of the invention in acceleration mode. To accelerate the engine comprising firing pins as otherwise indicate, the CPU calculates the stored energy available and determines the additional energy needed to accelerate. This additional energy can be obtained by faster activation of first pressure media entrance LP1 and first pressure media entrance LP2. As a result the firing pin firing rate or the cannon firing rate will increase. The CPU will have access to calculate and display the time until the stored energy is depleted. That is, under the second law of thermodynamics, the pressure in the system will decrease slightly over time due to entropy and require some external pressurization from pumps as noted above.

Figure 26:
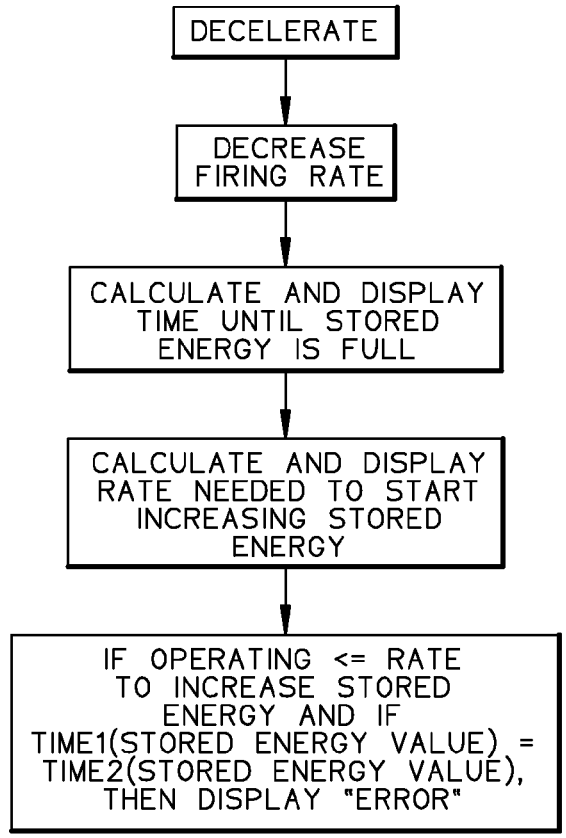
FIG. 26 is a schematic view of an embodiment of the invention.

FIG. 26 shows a logic pattern for operating an embodiment of the invention in deceleration mode. Deceleration involves reducing the firing rate. This involves a bit of the laws of motion as well as a bit of thermodynamics. As the firing rate decreases the energy being done on the system as a whole also decreases. Likewise reinvigorating the system requires some external energy. So, the time until the energy store is full is calculated and displayed by the CPU. Likewise, the rate needed to start increasing the stored energy is also calculated and displayed. If the operating rate is less than or equal to the rate to increase stored energy then if the first stored energy value at a first time is equal to the second stored energy value at a second time then an error is displayed. If not, no error is displayed.

Where a plurality of rotational firing pins 84 are used, the rotational firing pins 84 be are constantly fired with bursts of second pressure media. This is a synchronized mode of operation where the rotational firing pins 84 are fired at the same time without charging. In an alternating mode of operation, rotational firing pins 84 are charged then fired in an alternating manner. In some embodiments the alternating mode of operation can be accomplished with at least one step motor.

Figure 27:
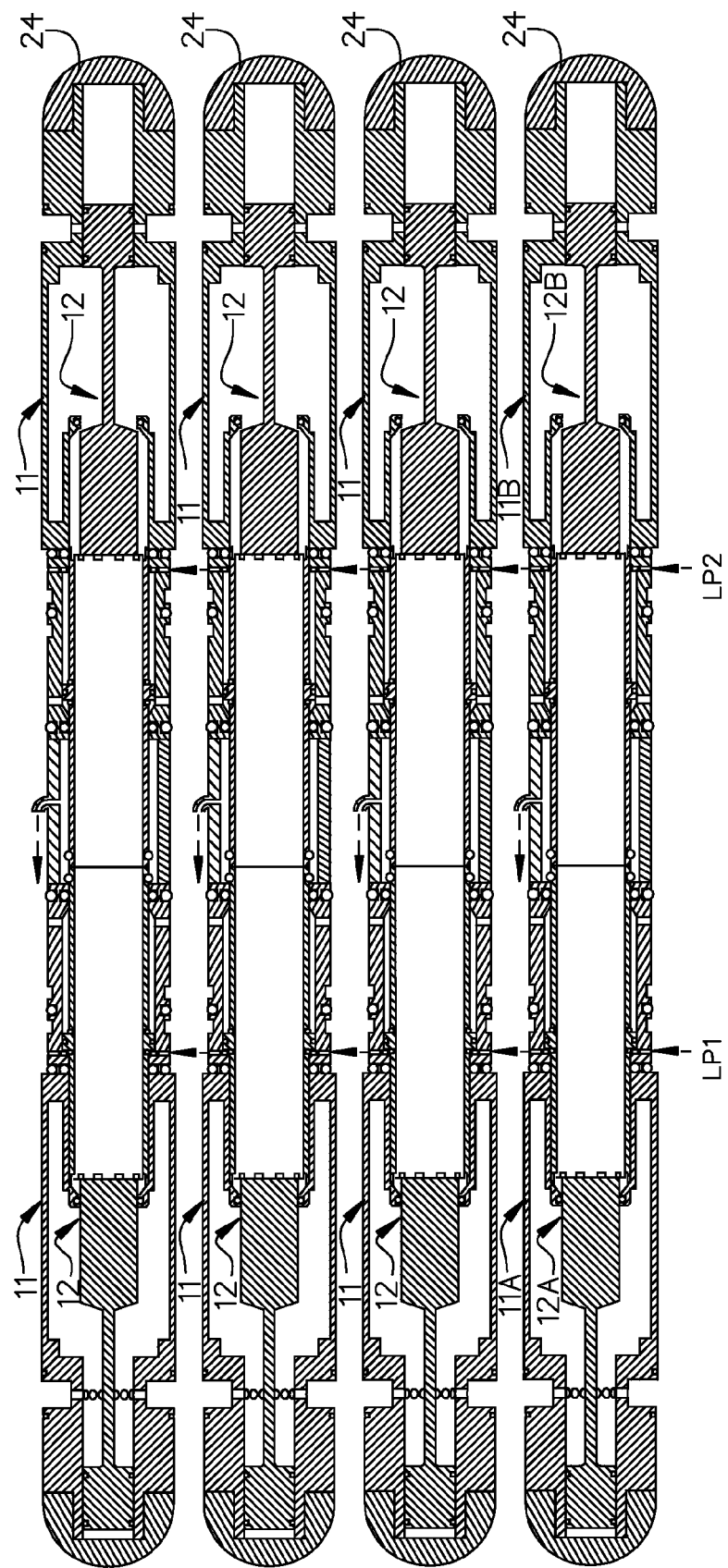
FIG. 27 is a section view of an embodiment of the invention.
Figure 28:
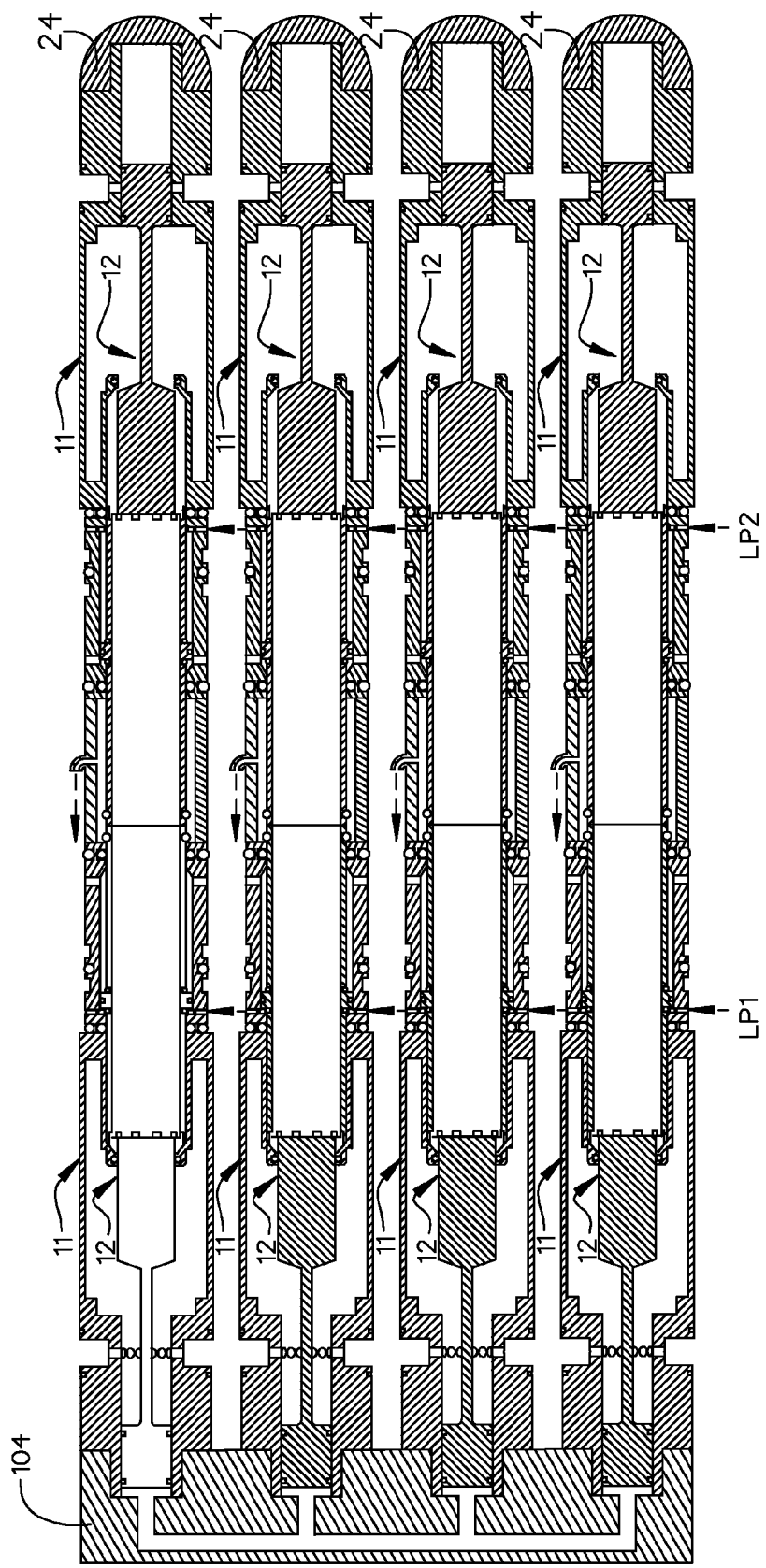
FIG. 28 is a section view of an embodiment of the invention.

FIG. 27 and FIG. 28 show how to operate a plurality of cannons 10 in parallel. First left firing pin 12A is arranged in series with first right firing pin 12B. This can be accomplished by attaching first left firing pin casing 11A to second left firing pin casing 11B. First pressure media can enter into first left firing pin casing 11A through first pressure media entrance LP1. Likewise, first pressure media can enter into first right firing pin casing 11 through first pressure media entrance LP2. Media is compressed and exits through a media exit centrally located between the two firing pins 12. Additional firing pins 12 can be added as desired. In some situations a plurality of canons 10 can be installed in channel block 104 which directs the media into channels between the plurality of cannons 10. In FIG. 27, the plurality of cannons 10 have more than one exit port. In FIG. 28, the plurality of cannons 10 have a single exit ports.

Figure 29:
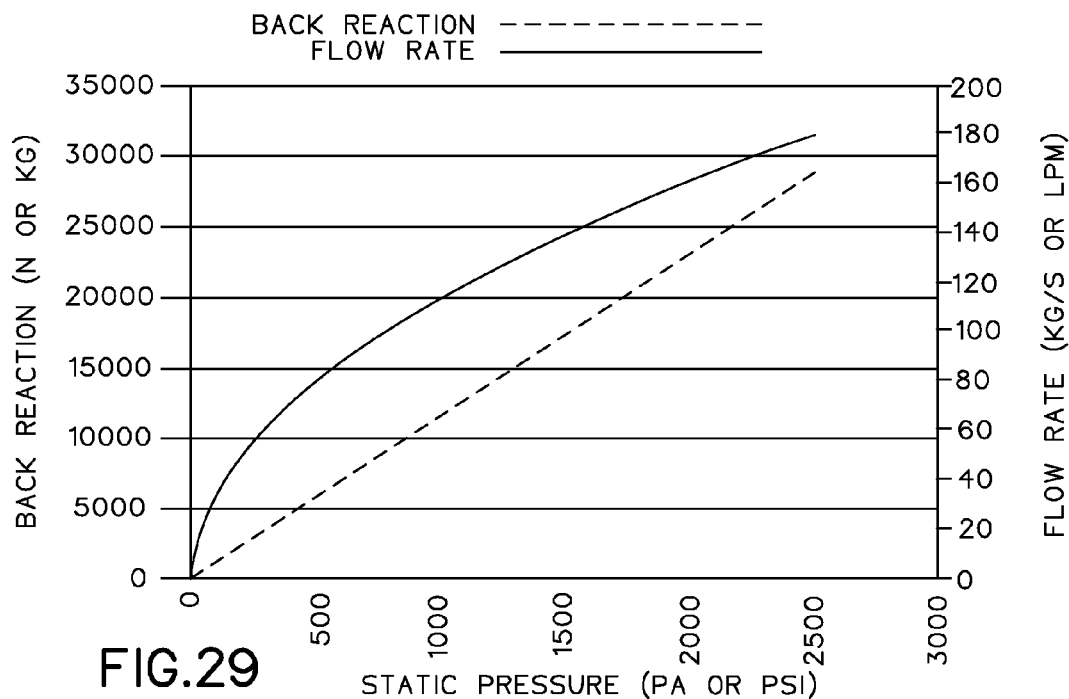
FIG. 29 is a chart of performance of an embodiment of the invention.
Figure 30:
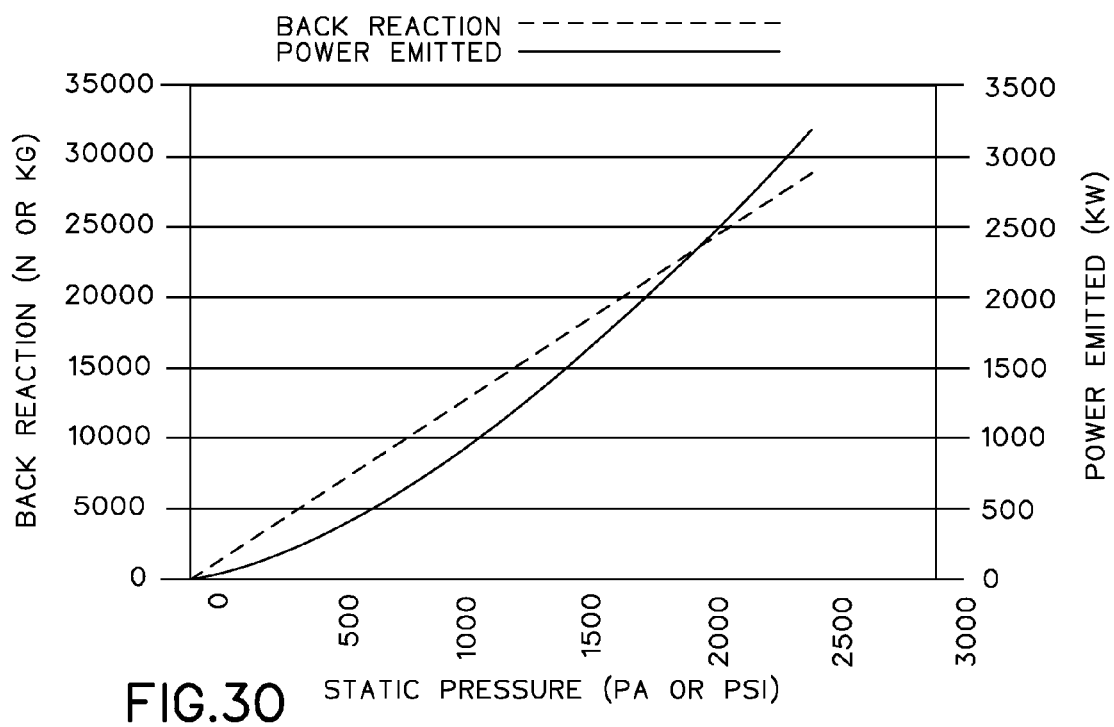
FIG. 30 is a chart of performance of an embodiment of the invention.

FIG. 29 shows how increasing pressure will also increase flow rate of the system. FIG. 30 shows how charging the system with greater static pressure can result in more work done by the system.

In some situations, springs can provide additional work resulting in additional efficiency for the system. For instance in FIG. 31, firing pin stern 16 is mechanically coupled to large spring 106, which is further mechanically coupled to firing pin outer casing 11. Likewise in FIG. 32, first pressure port to charge 56 is replaced with small spring 108, using spring force, as opposed to hydraulic force for the same affect.

Figure 33:
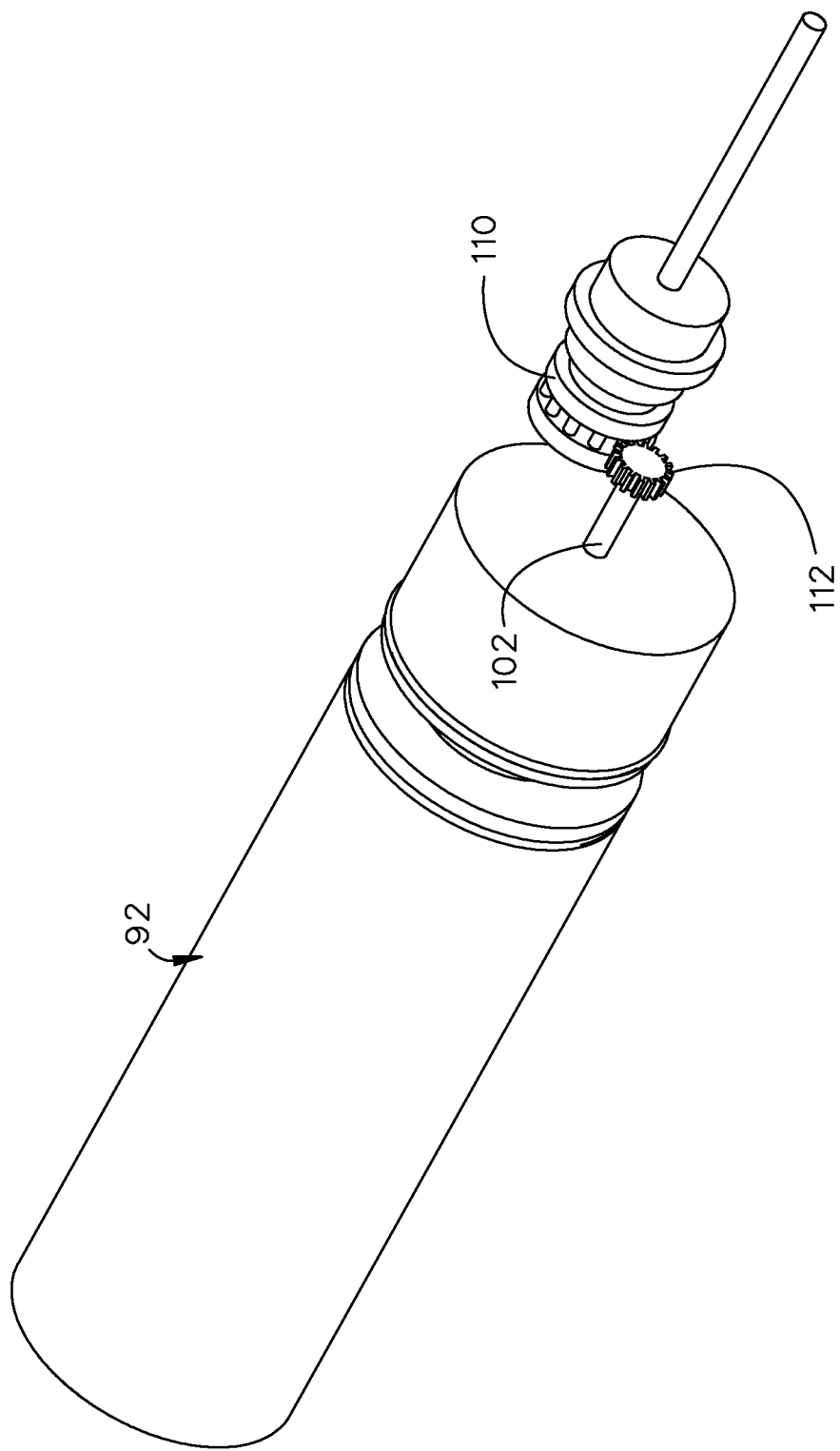
FIG. 33 is a perspective view of an embodiment of the invention.
Figure 34:
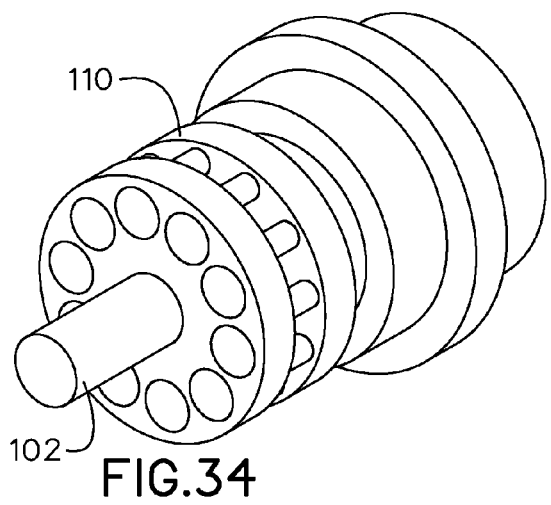
FIG. 34 is a perspective view of an embodiment of the invention.
Figure 35:
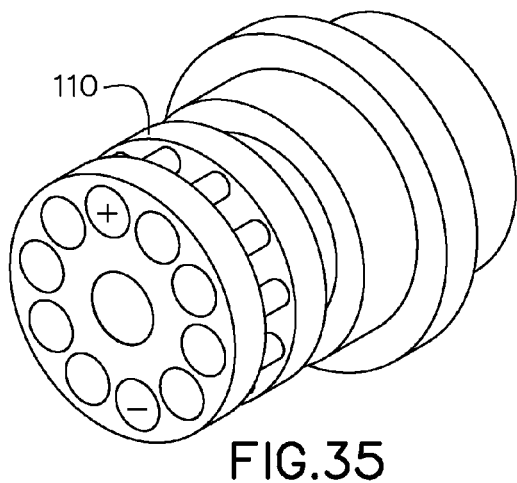
FIG. 35 is a perspective view of an embodiment of the invention.
Figure 36:
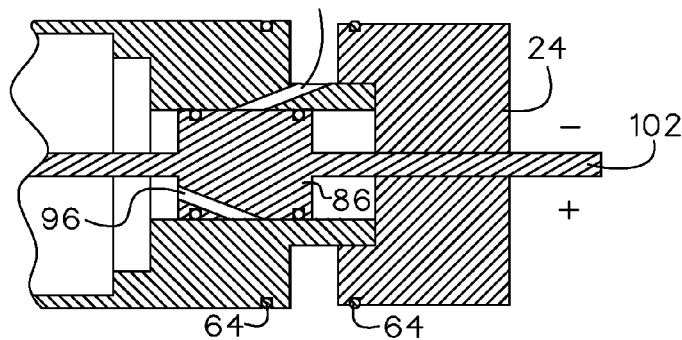
FIG. 36 is a section view of an embodiment of the invention.
Figure 37:
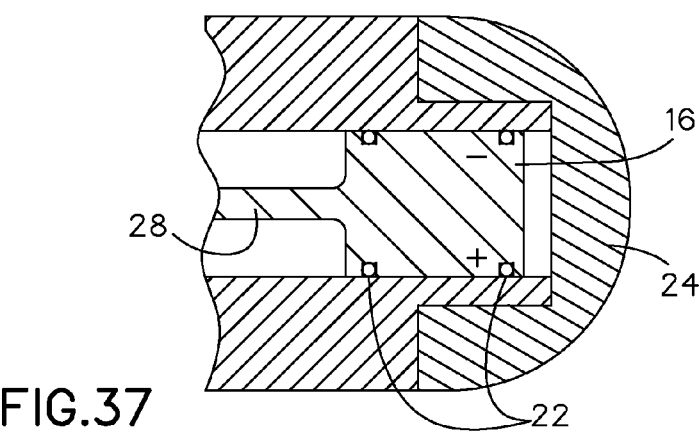
FIG. 37 is a perspective view of an embodiment of the invention.

In FIG. 33, outer casing 92 is perforated with turn shaft 102. Turn shaft 102 is mechanically coupled to gear 112. Motor 110 creates mechanical energy which can be used to turn gear 112. Mechanical energy from motor 110 can be used to turn another shaft as in FIG. 34 or to turn a generator to create electrical power as in FIG. 35. As shown in FIGS. 36 and 37, magnetic flux can be imparted onto the other shaft or firing pin stem 16 to further increase system efficiency.

Persons of ordinary skill in the art may appreciate that numerous design configurations may be possible to enjoy the functional benefits of the inventive systems. Thus, given the wide variety of configurations and arrangements of embodiments of the present invention the scope of the invention is reflected by the breadth of the claims below rather than narrowed by the embodiments described above.

What is claimed is:

1. An engine propulsion system that utilizes bursts of a pressurized media in order to transmit mechanical energy by a rotational firing pin, the engine propulsion system comprising:
at least one cannon, wherein the at least one cannon is configured to displace the pressurized media and further comprising;
a casing that internally houses the rotational firing pin;
the rotational firing pin further comprising a stern fixedly joined to a first end of a stem and an obstruction cylinder fixedly joined to a second end of the stem such that the stern, the stem and the obstruction cylinder rotate together;
a plurality of charge shafts bored through the stern, each of the plurality of charge shafts comprising a media inlet and a media outlet distant from the media inlet such that the pressurized media is configured to flow into the media inlet and exit at the media outlet;
a cannon port entrance shaft bored into the casing configured to insert and direct the pressurized media into each media inlet of each of the plurality of charge shafts;
a pair of outer seals, a first seal of the pair of outer seals is arranged on an upstream side of the cannon port entrance shaft and a second seal of the pair of outer seals is arranged on a downstream side of the cannon port entrance shaft, wherein the pair of outer seals is configured to direct the pressurized media through the cannon port entrance shaft into each of the plurality of charge shafts;
a firing pin chamber defined within the casing entirely surrounding the stem, wherein the firing pin chamber accumulates the pressurized media exiting each media outlet of each of the plurality of charge shafts;
a plurality of firing shafts bored through the obstruction cylinder and arranged circumferentially about the obstruction cylinder, wherein each of the plurality of firing shafts is configured to be aligned with at least one discharge port of a plurality of discharge ports, wherein each of the plurality of discharges ports are bored into the casing and are arranged circumferentially about the casing;
at least one seal disposed adjacent to each of the plurality of firing shafts configured to prevent the pressurized media from escaping the cannon at locations other than the plurality of firing shafts;
a turn shaft mechanically coupled to the stern;
a motor attached to the turn shaft, wherein the motor is configured to turn the turn shaft, the stern, the stem and the obstruction cylinder such that the rotational firing pin transmits the mechanical energy.

2. The engine propulsion system of claim 1, wherein the at least one cannon is proximate a media propulsion system; the media propulsion system further comprises: a reservoir which contains the pressurized media.

3. The engine propulsion system of claim 1, wherein the at least one cannon is proximate a media propulsion system; wherein the media propulsion system further comprises: a pump configured to pump the pressurized media.

4. The engine propulsion system of claim 1, wherein the at least one cannon is proximate a media propulsion system; wherein the media propulsion system further comprises: at least one pressure intensifier to condition the pressurized media for pressurization.

5. The engine propulsion system of claim 1, wherein the at least one cannon is proximate a media propulsion system; wherein the media propulsion system further comprises: at least one check valve.

6. The engine propulsion system of claim 1, wherein the at least one cannon is proximate a media propulsion system; wherein the media propulsion system further comprises: at least one accumulator attached to a regulator and is configured to accumulate the pressurized media.

7. The engine propulsion system of claim 1, wherein the at least one cannon is proximate a media propulsion system; wherein the media propulsion system further comprises: at least one solenoid attached to the casing and configured to disperse the pressurized media.

8. The engine propulsion system of claim 1, wherein the at least one cannon is configured to operate in a synchronized mode of operation.

9. The engine propulsion system of claim 8, wherein the synchronized mode of operation uses the motor.

10. The engine propulsion system of claim 1, wherein the at least one cannon is configured to operate in an alternating mode of operation.

11. The engine propulsion system of claim 10, wherein the alternating mode of operation uses the motor.

* * * * *